US009309962B2

(12) United States Patent
Matsushita et al.

(10) Patent No.: US 9,309,962 B2
(45) Date of Patent: Apr. 12, 2016

(54) SHIFTING DEVICE OF MANUAL TRANSMISSION APPARATUS FOR AUTOMOBILE

(75) Inventors: Ryuichi Matsushita, Aichi (JP); Hiroyuki Tanaka, Aichi (JP)

(73) Assignee: AISIN AI CO., LTD., Aichi (JP)

( * ) Notice: Subject to any disclaimer, the term of this patent is extended or adjusted under 35 U.S.C. 154(b) by 130 days.

(21) Appl. No.: 13/810,611

(22) PCT Filed: Aug. 10, 2011

(86) PCT No.: PCT/JP2011/004519
§ 371 (c)(1),
(2), (4) Date: Jan. 16, 2013

(87) PCT Pub. No.: WO2012/023262
PCT Pub. Date: Feb. 23, 2012

(65) Prior Publication Data
US 2013/0133456 A1    May 30, 2013

(30) Foreign Application Priority Data

Aug. 20, 2010   (JP) ................................. 2010-185440

(51) Int. Cl.
*F16H 59/02*     (2006.01)
*G05G 5/05*      (2006.01)
*F16H 61/24*     (2006.01)

(52) U.S. Cl.
CPC ............ *F16H 59/0208* (2013.01); *F16H 59/02* (2013.01); *F16H 61/24* (2013.01); *G05G 5/05* (2013.01); *F16H 2061/243* (2013.01); *F16H 2061/245* (2013.01); *Y10T 74/2014* (2015.01)

(58) Field of Classification Search
CPC ......... F16H 61/18; F16H 61/24; F16H 59/02; F16H 59/0208; F16H 2061/243; F16H 2061/245
USPC ................... 74/473.27, 473.28, 473.3, 522.2
See application file for complete search history.

(56) References Cited

U.S. PATENT DOCUMENTS 4,365,522 A * 12/1982 Kubota .................. F16H 59/10
                                                192/218
4,807,489 A    2/1989 Schreiner et al.
(Continued)

FOREIGN PATENT DOCUMENTS

CN    101614276    12/2009
EP    1 273 832    1/2003
(Continued)

OTHER PUBLICATIONS

Extended European Search Report issued by the European Patent Office on Jun. 12, 2014.
(Continued)

*Primary Examiner* — William C Joyce
(74) *Attorney, Agent, or Firm* — IP & T Group LLP

(57) ABSTRACT

A shifting device of manual transmission apparatus for automobile is provided, shifting device which reduces fluctuations in operational loads at the time of selecting operations. A shifting device 11 of manual transmission apparatus for automobile according to the present invention is characterized in that it is a shifting device 11 of manual transmission apparatus for automobile, the shifting device 11 comprising: a casing; a shift lever 2 being retained rotatably with respect to the casing; a retaining member 3 interlocking with the shift lever 2 to swing; a locking ball pin 4 comprising a rotatable roller 41, a locking-ball-pin body 43 unit retaining the roller 43 rotatably, and an expandable and contractible spring 42 being fixed with respect to the retaining member 3 at one of the opposite ends and with respect to the locking-ball-pin body unit 43 at the other one of the opposite ends; and a cam member 5 comprising a cam face 51 with which the roller 41 comes into contact rotatably, and being fixed so as to be swingable in relative to the locking ball pin 4; and it further comprises a damper inhibiting said spring from expanding and contracting.

7 Claims, 8 Drawing Sheets

(56) References Cited

U.S. PATENT DOCUMENTS 5,456,131 A * 10/1995 Nakamura et al. ......... 74/473.21
5,934,145 A *  8/1999 Ersoy ..................... F16H 59/10
                                                    74/471 XY

FOREIGN PATENT DOCUMENTS

| JP | 61-174345 | | 10/1986 |
| JP | 63-005520 | | 1/1988 |
| JP | 09-72155 | | 3/1997 |
| JP | 2001-56716 | | 2/2001 |
| JP | 2009-83515 | | 4/2009 |
| KR | 10-2009-0008805 | * | 1/2009 |

OTHER PUBLICATIONS

Preliminary Rejection issued by the Japanese Intellectual Property Office on Nov. 8, 2011.
First Office Action issued by the State Intellectual Property Office of the People's Republic of China on Feb. 3, 2015.

* cited by examiner

SHIFTING DEVICE OF MANUAL TRANSMISSION APPARATUS FOR AUTOMOBILE

This application is a national stage application of PCT/JP2011/004519 filed on Aug. 10, 2011, which claims priority of Japanese patent application number 2010-185440 filed on Aug. 20, 2010. The disclosure of each of the foregoing applications is incorporated herein by reference in its entirety.

TECHNICAL FIELD

The present invention relates to a shifting device of manual transmission apparatus for automobile.

BACKGROUND ART

In manual transmission apparatuses for automobile, selecting loads of the shift lever are usually set up properly from a viewpoint of the shifting operability. By setting up them properly, the following are intended: making the neutral positions definite; exerting the sense of exactness or preciseness in the shifting operations; and upgrading the shift feelings. Moreover, selecting loads, which result in the prevention of failure or miss selections, and the like, are also taken into account. As a structure for selecting loads, one such as Patent Literature No. 1 has been available, for instance. In Patent Literature No. 1, a structure is disclosed, structure in which a spring 5b is installed onto an arm 3 that interlocks with a shift lever, and a roller 5d, which is installed onto the leading end of that spring 5b, comes into contact with a cam face 8a to rotate, thereby generating selecting loads. In Patent Literature No. 1, since a cam-face part 8, which constitutes the cam face 8a, is made detachable, it is possible to replace various kinds of cam-face parts, which have different cam faces one another, to use.

A so-called heavy selection system has been available so far as the prevention of miss shifting into reverse, for instance. It is a system that prevents the miss shifting by making loads higher at the time of selecting into reverse.

RELATED TECHNICAL LITERATURE

Patent Literature

Patent Literature No. 1: Japanese Unexamined Patent Publication (KOKAI) Gazette No. 2009-83515

SUMMARY OF THE INVENTION

Assignment to be Solved by the Invention

Incidentally, in a heavy selection system by means of such a constitution of the spring and the earn face as Patent Literature No. 1, operational loads fluctuate greatly depending on the speeds of selecting operations by drivers. In a case where a selecting operation is carried out at a certain speed, a kinetic energy generates by means of the masses and speeds of constituent component parts. This kinetic energy adds to an operation load, and thereby the selecting operation becomes feasible. Since this kinetic energy is proportional to the square of the speed, the faster the operational speed for selecting into reverse is, the greater the kinetic energy becomes, and eventually the operational load becomes smaller. On the other hand, the operational load becomes greater when the speed is slower. The present invention is one which has been done in view of the aforementioned assignments. It is an assignment to be solved to provide a shifting device of manual transmission apparatus, shifting device which reduces fluctuations in operational loads at the time of selecting operations.

Means for Solving the Assignment

Constitutional characteristics of the invention being directed to claim 1 for solving the aforementioned, assignment lie in that:
it is a shifting device of manual transmission apparatus for automobile, the shifting device comprising:
  a casing;
  a shift lever being retained rotatably with respect to said casing;
  a retaining member interlocking with said shift lever to swing;
  a locking ball pin comprising a rotatable roller, a body unit retaining said roller rotatably, and an expandable and contractible spring being fixed with respect to said retaining member at one of the opposite ends and with respect to said body unit at the other one of the opposite ends; and
  a cam member comprising a cam face with which said roller comes into contact rotatably, and being fixed so as to be swingable in relative to said locking ball pin; and
it further comprises a damper inhibiting said spring from expanding and contracting.

In addition to the above, constitutional characteristics of the invention being directed to claim 2 for solving the aforementioned assignment lie in that:
it is a shifting device of manual transmission apparatus for automobile, the shifting device comprising:
  a casing;
  a shift lever being retained, swingably with respect to said casing;
  a cam member comprising a cam face, and interlocking with said shift lever to swing;
  a retaining member being fixed so as to be swingable in relative to said shift lever and cam member; and
  a locking ball pin comprising a rotatable roller interlocking with said shift lever to come into contact with said cam face, a body unit retaining said roller rotatably, and an expandable and contractible spring being fixed with respect to said retaining member at one of the opposite ends and with respect to said body unit at the other one of the opposite ends; and
it further comprises a damper inhibiting said spring from expanding and contracting.

Moreover, constitutional characteristics of the invention being directed to claim 3 lie in that, in claim 1 or 2, said damper is put in place coaxially inside said spring.

Moreover, constitutional characteristics of the invention being directed to claim 4 lie in that, in any one of claims 1 through 3, said damper is fixed with respect to one of said retaining member and said locking ball pin on one of the sides in the expanding and contracting directions; and a clearance is disposed between the other one of said retaining member and said locking ball pin at the time of neutral and the other one of the sides therein where any one of a plurality of change-speed stages are not selected in the automobile.

Effect of the Invention

The invention being directed to claim 1 comprises a damper that inhibits a spring from expanding and contracting. The spring is fixed with respect to a retaining member, which swings while interlocking with a shift lever that is rotated by means of selecting operations, at one of the opposite ends, and is fixed with respect to a body unit, which retains a roller that rotates while coming into contact with a cam member's cam face, at the other one of the opposite ends. Thus, the spring is inhibited from expanding and contracting by means of the damper, thereby reducing fluctuations in operational loads.

The invention being directed to claim 2 comprises a damper that inhibits a spring from expanding and contracting. The spring is fixed with respect to a retaining member, which is fixed so as to be swingable in relative to a cam member that swings while interlocking with a shift lever that is rotated by means of selecting operations, at one of the opposite ends, and is fixed with respect to a body unit, which retains a roller that rotates while coming into contact with the cam member's cam face, at the other one of the opposite ends. Thus, the spring is inhibited from expanding and contracting by means of the damper, thereby reducing fluctuations in operational loads.

In the invention being directed to claim 3, it is possible to reduce fluctuations in operational loads without ever being accompanied by any space securement or considerable structural alteration that results from adding the damper, because the damper is put in place coaxially inside the spring.

In the invention being directed to claim 4, the damper is disposed so that it is fixed with respect to one of the retaining member and a locking ball pin on one of the sides in the expanding and contracting directions, and a clearance is further disposed between the other one of the retaining member and the locking ball pin and the other not-fixed or free side in the directions at the time of neutral where any of change-speed stages are not selected. By means of thus disposing the clearance, it is feasible to set up an operational load, to which the damper does not add any load but the spring alone adds a load, in a given selecting operation. For example, it is possible to let the damper add a load only when selecting into reverse.

MODES FOR CARRYING OUT THE INVENTION

Representative embodiment modes according to the present invention will be explained with reference to FIG. 1 through FIG. 10. A shift device of manual transmission apparatus for automobile (hereinafter being referred to as a "shifting device") being directed to the present embodiment modes is mounted on a vehicle.

Embodiment No. 1

Figure 1:
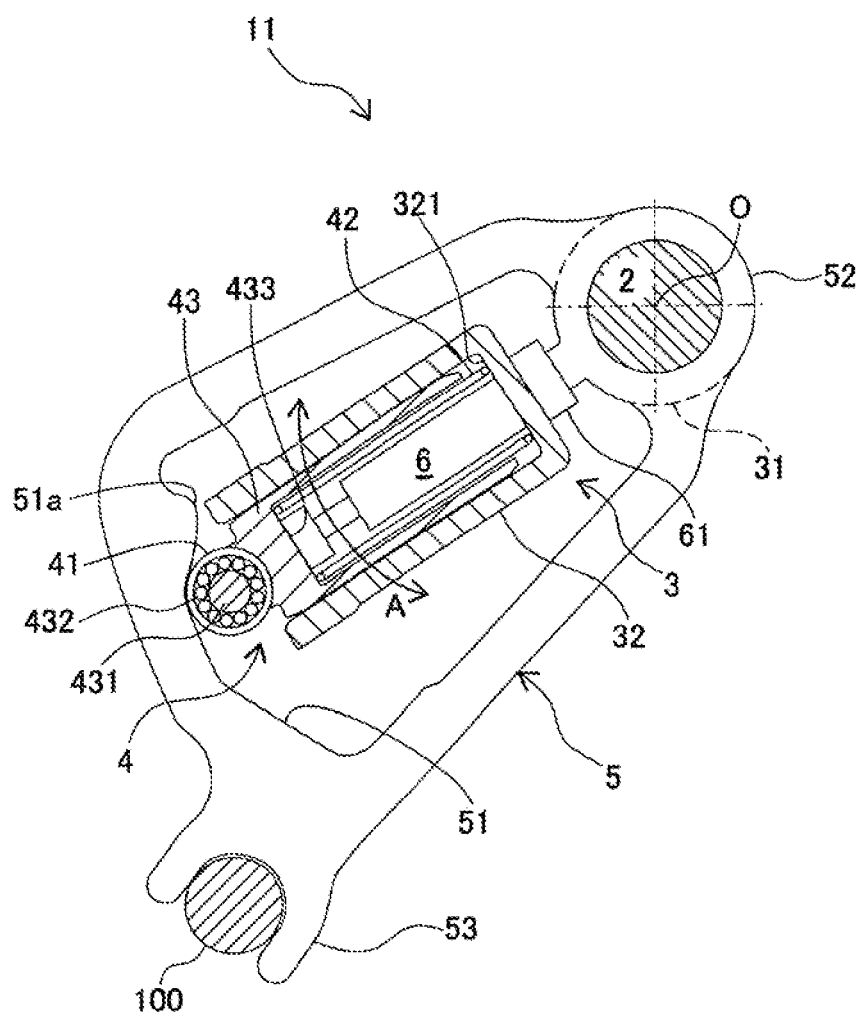
FIG. 1 is an explanatory diagram that exhibits a constitution of a shifting device 11 according to Embodiment No. 1 in the partially cross section.
Figure 2:
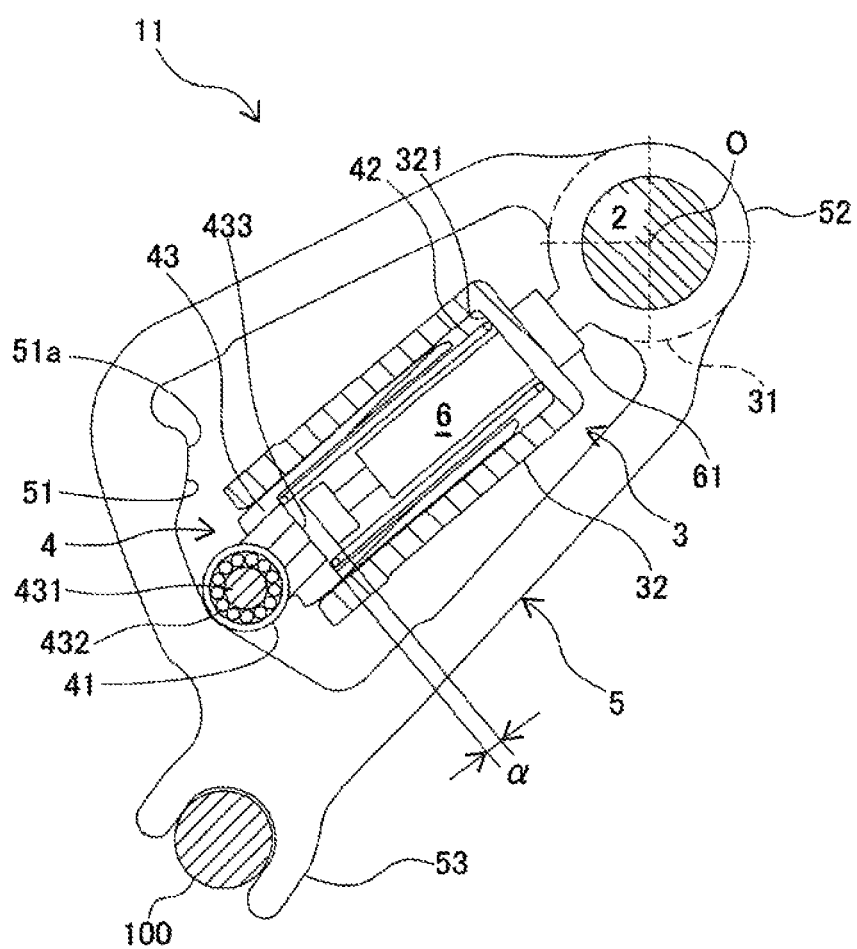
FIG. 2 is another explanatory diagram that exhibits the constitution of the shifting device 11 according to Embodiment No. 1 in the partially cross section.

As illustrated in FIG. 1 and FIG. 2, a shifting device 11 according to present Embodiment No. 1 comprises a casing (not shown in the figures), a shift lever 2, an arm (i.e., claimed "retaining member") 3, a locking ball pin 4, a cam member 5, and a damper 6.

The shift lever 2 is retained rotatably with respect to the casing. The shift lever 2 interlocks with a change-speed operation lever (not shown in the figures) that is operated by an automotive driver in order to change speeds, and rotates around the rotary center "O" in accordance with operating forces for selection that are transmitted in association with directing operations for selection.

The arm 3 comprises an engaging unit 31, which interlocks with, the shift lever 2 to swing and which, engages integrally but swingably with the shift lever 2, and a bottomed tubular-shaped case unit 32 in which a later-described locking ball pin 4 is accommodated. The case unit 32 is opened on one of the side that is opposite to the engaging unit 31 (namely, on one of the sides that is opposite to the shift lever 2).

The locking ball pin 4 comprises a roller 41, a spring 42, and a bottomed tubular-shaped locking-ball-pin body unit 43. The locking-ball-pin body unit 43 is opened at one of the opposite ends on the side of the shift lever 2, and is accommodated slidably through the opened side of the case unit 32 in the arm 3 in such a state that its own opening is faced to the shift lever 2. The roller 41 engages rotatably with a shaft portion 431, which is present at an opposite end of the locking-ball-pin body unit 43 on the not-opened side, by way of a bearing 432. The spring 42 is fixed at one of the opposite ends with respect to a bottom 321 of the case unit 32 in the arm 3, and is fixed at the other one of the opposite ends with respect to a bottom 433 of the locking-ball-pin body unit 43. Moreover, the spring 42 is accommodated expandably and contractibly in the locking-ball-pin unit body 43 in such directions that connect the shift lever 2 with the roller 41 (hereinafter being referred to as "expanding and contracting directions"). The locking-ball-pin body unit 43 slides within the case unit 32 of the arm 3 in the expanding and contracting directions while interlocking with the spring 4 that expands and contracts.

The cam member 5 comprises an irregularly-shaped cam face 51 with which the roller 41 of the locking ball pin 4 comes into contact to rotate. And, the cam member 5 is fixed swingably in relative to the locking ball pin 4 by means of a first installation unit 52 through which the shift lever 2 is axially inserted relatively rotatably, and by means of a second installation unit 53 to be installed with respect to a supporting member 100. The supporting member 100 is a member that is to be fixed with respect to a fixing member such as the casing. Of the cam face 51, a convened segment 51a, which exhibits a shortened distance up to the rotary center "O," copes with selecting loads for selecting into reverse.

The damper 6 is fixed with respect to the arm 3 at one of the opposite ends by means of a nut 61, and is accommodated coaxially inside the spring 42 of the locking ball pin 4 expandably and contractibly in the expanding and contracting directions. The damper 6, and the locking ball pin 4 are put in place within the locking-ball-pin body unit 43 parallelly.

In the shifting device 11 according to present Embodiment No. 1, the shift lever 2 interlocks with the actuated change-speed operation lever to rotate around the rotary center "O" when a driver operates the change-speed operation lever in order to do change-speed operations. Then, the arm 3 and locking ball pin 4 swing in such directions as depicted by the arrow "A" about the rotary center "O" that serves as the swing center. When the arm 3 and locking ball pin 4 thus swing, the roller 41 of the locking ball pin 4 rolls on the cam face 51 of the cam member 5. The roller 41 rotates along the configuration of the cam face 51, thereby varying the distance between the rotary center "O" and the cam face 51. That is, when the roller 41 rotates on the cam face 51 while coming into contact with it, the spring 42 of the locking ball pin 4 expands and contracts.

It is FIG. 1 that illustrates a condition of the shifting device 11 in which the change-speed operation lever is present at a position for selecting the first-speed stage or the second-speed stage. It is FIG. 2 that illustrates another condition of the shifting device 11 in which the change-speed operation lever is present at a neutral position so that none of the change-speed stages are selected. Upon being at a neutral position, the distance between the rotary center, "O" and the cam face 51 is set up so that they are placed away from each other most remotely in the shifting device 11 according to present Embodiment No. 1. And, a predetermined clearance "α" is disposed between the locking-ball-pin body unit 43 of the locking ball pin 4 and the other opposite end of the damper 6 (namely, an opposite end that is present on an opposite side to the one of the opposite ends that is fixed with respect to the arm 3 in the expanding and contracting directions). When the roller 41 rotates on the cam face 51, while coming into contact with it, from a position that corresponds to neutral, a load comes to occur in the spring 42 in operations for selecting a position from those which are immediately adjacent to a neutral position. When the spring 42 contracts by the clearance "α," another load, which occurs in the damper 6, adds to the load that occurs in the spring 42. When the roller 41 rotates while coming into contact with the convened segment 51a (namely, a location that corresponds to reverse) where the distance between the rotary center "O" and the cam face 51 is set up so as to foe shortened, the spring 42, and the damper 6 contract.

Figure 3:
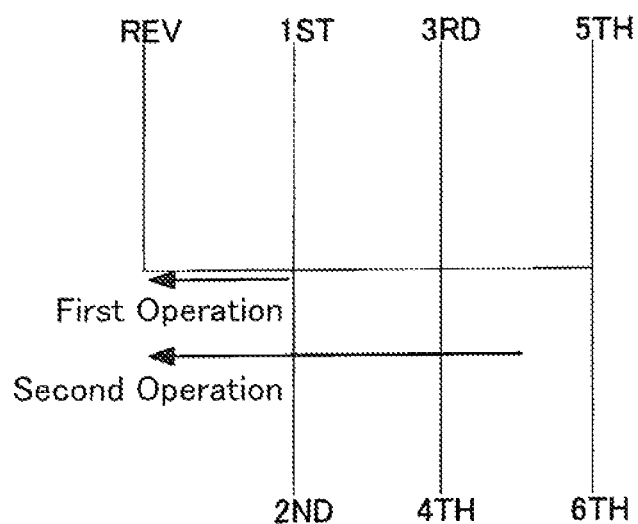
FIG. 3 is an explanatory diagram that exhibits a shift map being used in a vehicle that has the shifting device 11 according to Embodiment No. 1 on-board.

Next, a comparison will be hereinafter made simply as to operational loads in the shifting device 11 according to present Embodiment No. 1 and those in a conventional shifting device (namely, a device that is made by removing the damper 6 alone from the shifting device 11). First of all, as illustrated in FIG. 3, a shift map for vehicle in which the shifting device 11 according to present Embodiment No. 1 is used, three locations in the selecting directions correspond to "1ST" and "2ND," "3RD" and "4TH," and "5TH" and "6TH," respectively, in the shifting directions; and a selecting position, at which the shifting can be thrown into "REV (i.e., reverse)" alone, is put in place next to the selecting position for "1ST" and "2ND." A first operation is labeled a low-speed selection in which the selection operation is done at a slow speed "$V_1$," and in which the selection operation is made by starting from the position for selecting "1ST" and "2ND." (or "LOW") and then shifting into "REV." A second operation is labeled a high-speed selection in which the selection operation is done at a fast speed "$V_2$," and in which the selection operation is made by starting from the position for selecting "3RD" and "4TH" or "5TH" and "6TH" (or "HIGH") and then shifting into "REV." That is, the operational speeds for the selection operations make a relationship, $V_1 < V_2$.

Figure 4:
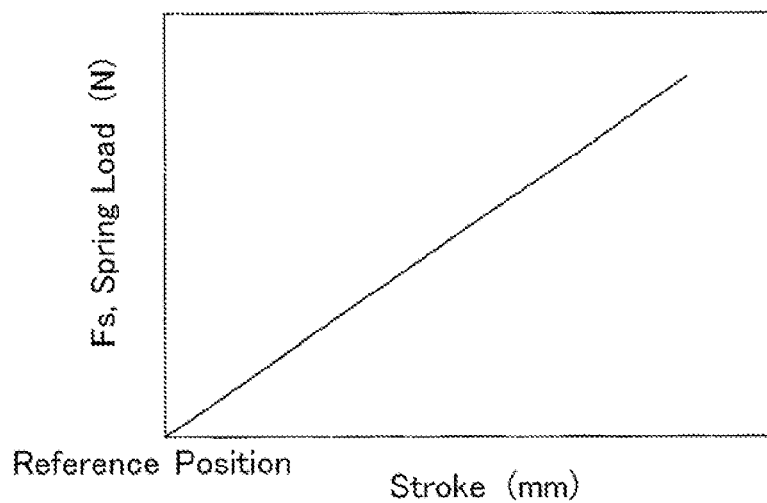
FIG. 4 is an explanatory diagram that exhibits the load characteristic of a spring.
Figure 5:
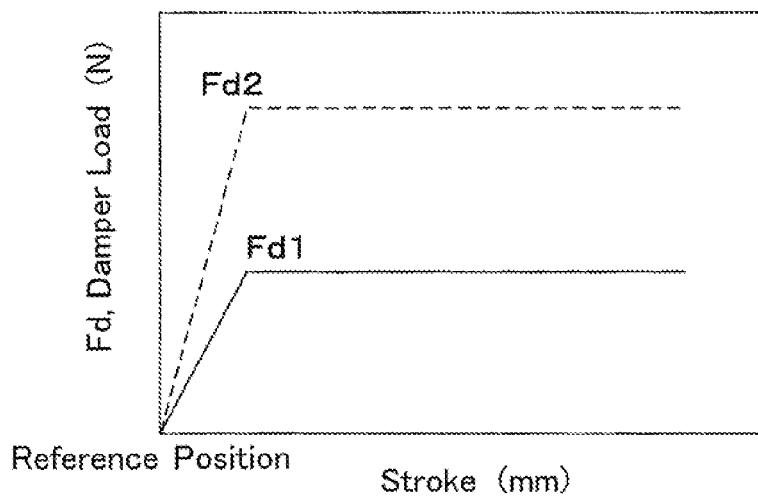
FIG. 5 is an explanatory diagram that exhibits the load characteristic of a damper.

Generally speaking, the load characteristic of spring is constant, regardless of the expanding and contracting speeds, as shown in FIG. 4. In FIG. 4, the vertical axis represents the loads $F_s$ (N) of a spring, and the horizontal axis represents the strokes (mm) (or the expanded and contracted lengths). The strokes are depicted as the lengths from a reference position, in which the position for selecting "LOW" serves as the reference position. As illustrated in FIG. 5, a damper exhibits different load characteristics depending on the expanding and contracting speeds. In FIG. 5, the vertical axis represents the loads $F_d$ (N) of a damper, and the horizontal axis represents the strokes (mm) (or the expanded and contracted lengths). The strokes are depicted as the lengths from a reference position, in which the position for selecting "LOW" serves as the reference position. The continuous lines represent the loads in the case of the low-speed selection, whereas the dotted lines represent the loads in the case of the high-speed selection.

When a stroke is labeled "s" and a sum of the masses of the change-speed operation lever, the shift lever and so on, which are exerted to the spring 42 and damper 6, is labeled "m," the relationship between work and kinetic energy in the conventional device, and that in the shifting device 11 are given as follows. First of all, when a selecting load, which is applied to the change-speed operation lever, is labeled "$F_1$," the following can express the relationship in the first operation in the conventional device:

$$"F_1" \times "s" = "F_s" \times "s" - (1/2) \times "m" \times "V_{12}" \tag{1}$$

Next, when another selecting load, which is applied to the change-speed operation lever, is labeled "$F_2$," the following can express the relationship in the second operation:

$$"F_2" \times "s" = "F_s" \times "s" - (1/2) \times "m" \times "V_{22}" \tag{2}$$

And, those above make the following when developing them as to the loads in the first operation and second operation:

$$"F_1" - "F_2" = \{("V_{22}" - "V_{12}") \times (1/2) \times "m"\} / "s" \tag{3}$$

$$"F_1" > "F_2" \tag{4}$$

Figure 6:
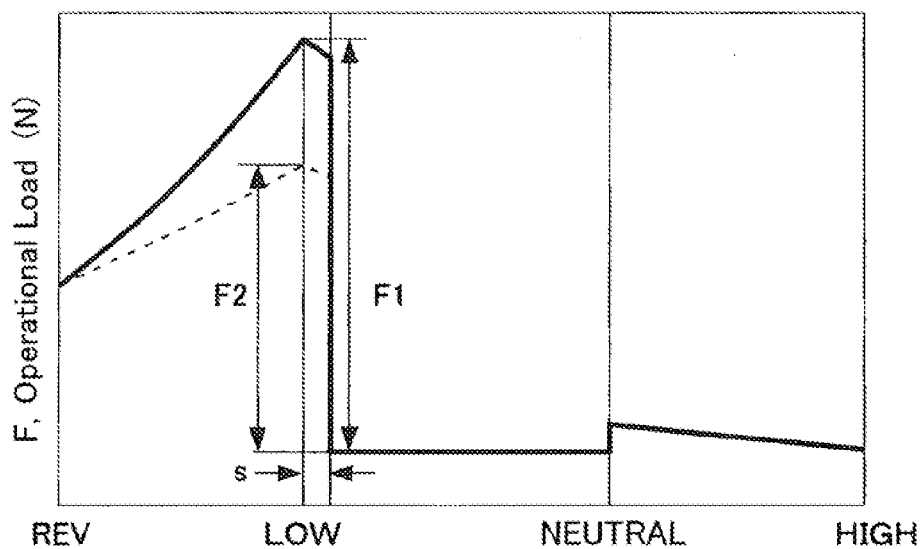
FIG. 6 is an explanatory diagram that exhibits the selecting-load characteristic of a conventional shifting device.

Hence, as illustrated in FIG. 6, the operational load "$F_2$," which arises upon selecting into reverse in the second operation for high-speed selection, is lower than the operational load "$F_1$," which arises upon selecting into reverse in the first operation for low-speed selection. Note that the continuous lines represent the operational loads "F" in the first operation, whereas the dotted lines represent the operational loads "F" in the second operation.

On the other hand, when a selecting load, which is applied to the change-speed operation lever, is labeled "$F_3$" and a load, which arises in the damper 6 in the case of the low-speed selection, is labeled "$F_{d1}$," the following can express the relationship in the first operation in the shifting device 11 according to present Embodiment No. 1:

$$"F_3" \times "s" = ("F_s" + "F_{d1}") \times "s" - (1/2) \times "m" \times "V_{12}" \tag{5}$$

Next, when another selecting load, which is applied to the change-speed operation lever, is labeled "$F_4$" and another load, which arises in the damper 6 in the case of the high-speed selection, is labeled "$F_{d2}$," the following can express the relationship in the second operation:

$$"F_4" \times "s" = ("F_s" + "F_{d2}") \times "s" - (1/2) \times "m" \times "V_{22}" \tag{6}$$

And, those above make the following when developing them as to the loads in the first operation and second operation:

$$"F_3"-"F_4"=[\{("V_{22}"-"V_{12}")\times(1/2)\times"m"\}/"s"]-("F_{d2}"-"F_{d1}") \quad (7)$$

Figure 7:
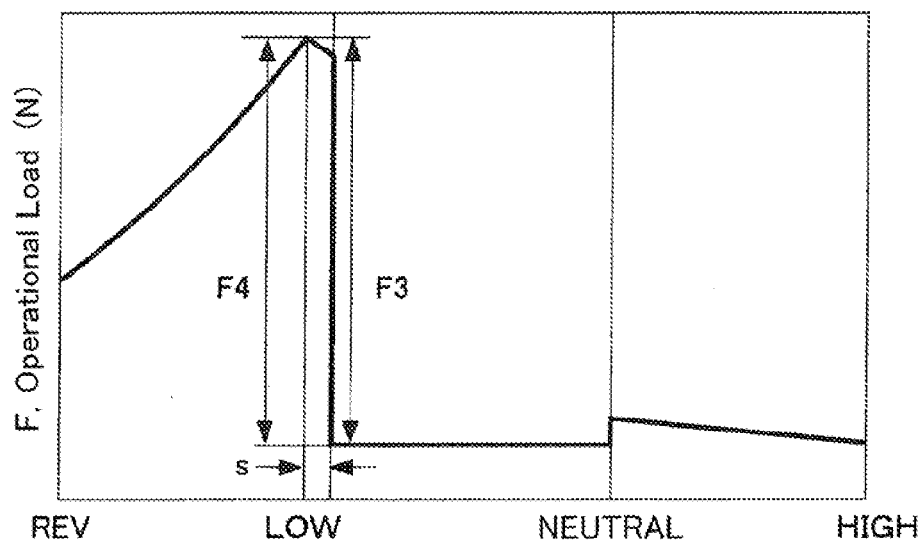
FIG. 7 is an explanatory diagram that exhibits the selecting-load characteristic of the shifting device 11 according to Embodiment No. 1.

Accordingly, setting the loads "$F_{d1}$" and "$F_{d2}$" properly results in "$F_3$"="$F_4$". Consequently, as illustrated in FIG. 7, the operational loads, which are applied to the change-speed operation lever in the first operation and second operation, become equal to each other. Hence, the operational load in the first operation upon the selection into reveres, and the operational load in the second operation upon the selection into reveres are represented so as to overlap one another.

In accordance with the shifting device 11 according to present Embodiment No. 1, it is possible to reduce fluctuations in the operational loads, because it comprises the damper 6 that inhibits the spring 42, which expands and contracts to interlock with the operations of the change-speed operation lever in order to add selecting loads to it, from expanding and contracting. The damper 6, which is put in place in parallel with the spring 42 whose load characteristic is not changed by means of speeds, inhibits the spring 42 from expanding and contracting, because it exhibits loads that differ greatly in compliance with speeds. That is, since a resultant load, which is obtained by combining a spring load resulting from the spring 42 with a damper load resulting from the damper 6, makes a selecting load, it is possible to reduce fluctuations in the operational loads, fluctuations which arise from the differences in the operational speeds. Note herein that, as for the characteristic of the damper 6, it is preferable to adjust it so as to make it possible to cancel kinetic energies that result from upgrading speeds, although being equipped with the damper 6 makes it possible to deter the operational loads from reducing at the time of the high-speed operation.

And, since the clearance is disposed between the damper 6 and the locking-ball-pin body unit 43 of the locking ball pin 4 at the time of neutral where none of the change-speed stages are selected, the loads resulting from the damper 6 are not at all added to the loads resulting from the spring 42 while the shifting operation is done from the neutral position up or down into a predetermined position. As for the predetermined position, it is possible to set it at some of the positions where the selection is made from "NEUTRAL" up or down into "HIGH" or "LOW." It is possible to materialize the process of getting up or down to "HIGH" or "LOW" by adjusting the size of the clearance "α" so as not to let the roller 41 come info contact with the locking-ball-pin body unit 43. In the shifting device 11 according to present Embodiment No. 1, a constant operational load arises upon doing the operation for selecting into reverse, as shown in FIG. 7, regardless of the operational speeds of the change-speed operation, because it is made so as to add the loads resulting from the damper 6 to the loads resulting from the spring 42.

Moreover, since the damper 6 is put in place inside the spring 42, it is possible to materialize a shifting device, which can reduce fluctuations in the operational loads, without ever enlarging the device or altering the design greatly.

Embodiment No. 2

A shifting device 12 according to Embodiment No. 2 comprises the same operations and advantageous effects as those of the shifting device 11 according to Embodiment No. 1 fundamentally. Hereinafter, explanations will be made while housing on the distinctive constitutions.

Figure 8:
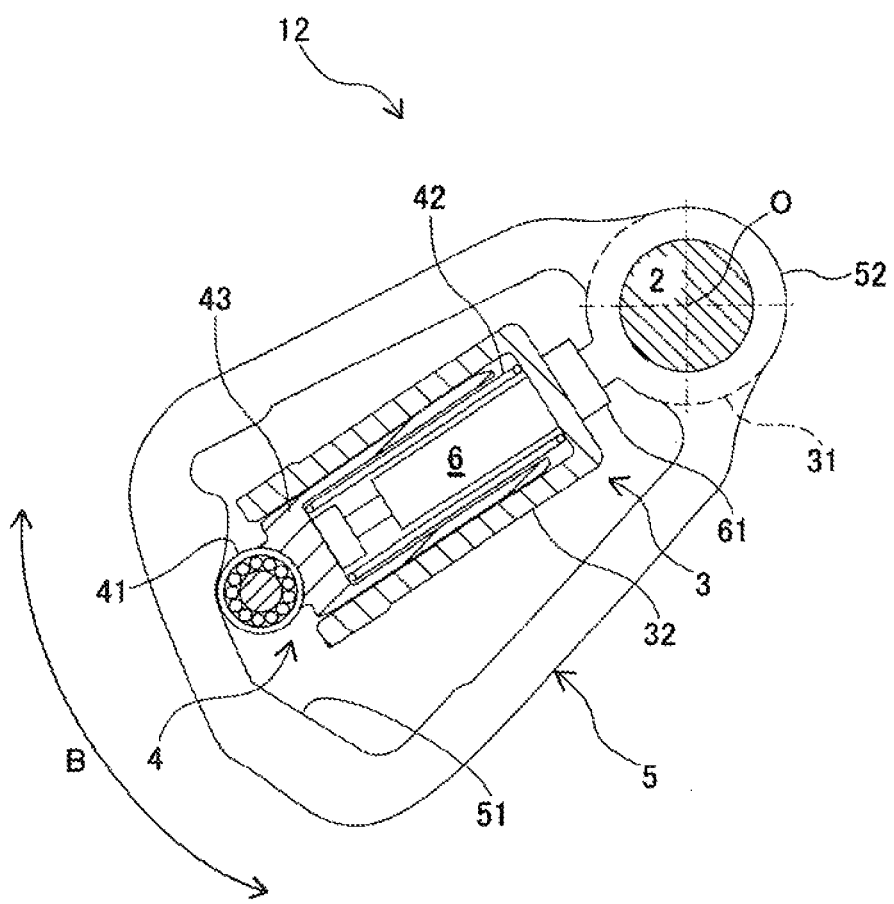
FIG. 8 is an explanatory diagram that exhibits a constitution of a shifting device 12 according to Embodiment No. 2 in the partially cross section.

As illustrated in FIG. 8, the shifting device 12 according to Embodiment No. 2 is free of a supporting member that fixes a cam member 5 unrotatably. The cam member 5 interlocks with the rotational motions of a shift lever 2, thereby swinging about a rotary center "O" that serves as the center (namely, in the directions of the arrow "B"). And, an arm 3 is capable of swinging relatively with respect to the shift lever 2 and cam member 5, namely, is fixed to them. Hence, a locking ball pin 4 does not swing, either, but a roller 41 is rotated on a cam face 51 by means of the swinging motions of the cam member 5 while coming into contact with the cam face 51. Since the roller 41 rotates on the cam face 51 while coming into contact with it in the same manner as the shifting device 11 according to Embodiment No. 1, a spring 42 expands and contracts depending on locations where the roller 41 comes into contact with the cam face 51. In the shifting device 12 according to Embodiment No. 2 as well, it is possible to dispose a space at any one of the neutral positions, in the same manner as the shifting device 11 according to Embodiment No. 1, without ever fixing the other one of the opposite ends of a damper 6 with respect to a locking-ball-pin body unit 43 of the locking ball pin 4. And, when doing a given operation, for example, when doing an operation of selecting into reverse, it is possible to add a load, which arises in the damper 6, to another load, which arises in the spring 42, by adjusting the load, which results from the damper 6, and the other load, which results from the spring 42.

Since the shifting device 12 according to present Embodiment No. 2, and the shifting device 11 according to Embodiment No. 1 are constituted so that the latter's constituent member that interlocks with the rotational motions of the shift lever 2, and the former's constituent member that does not interlock with them are altered one another, they operate and effect advantages similarly to each other. Therefore, it is possible to select one of them in conformity with the conditions of vehicles, on which they are to be mounted, and the like.

Modified Embodiment No. 1

A shifting device 13 according to Modified Embodiment No. 1 comprises the same operations and advantageous effects as those of the shifting device 11 according to Embodiment No. 1 fundamentally. Hereinafter, explanations will be made while focusing on the distinctive constitutions.

Figure 9:
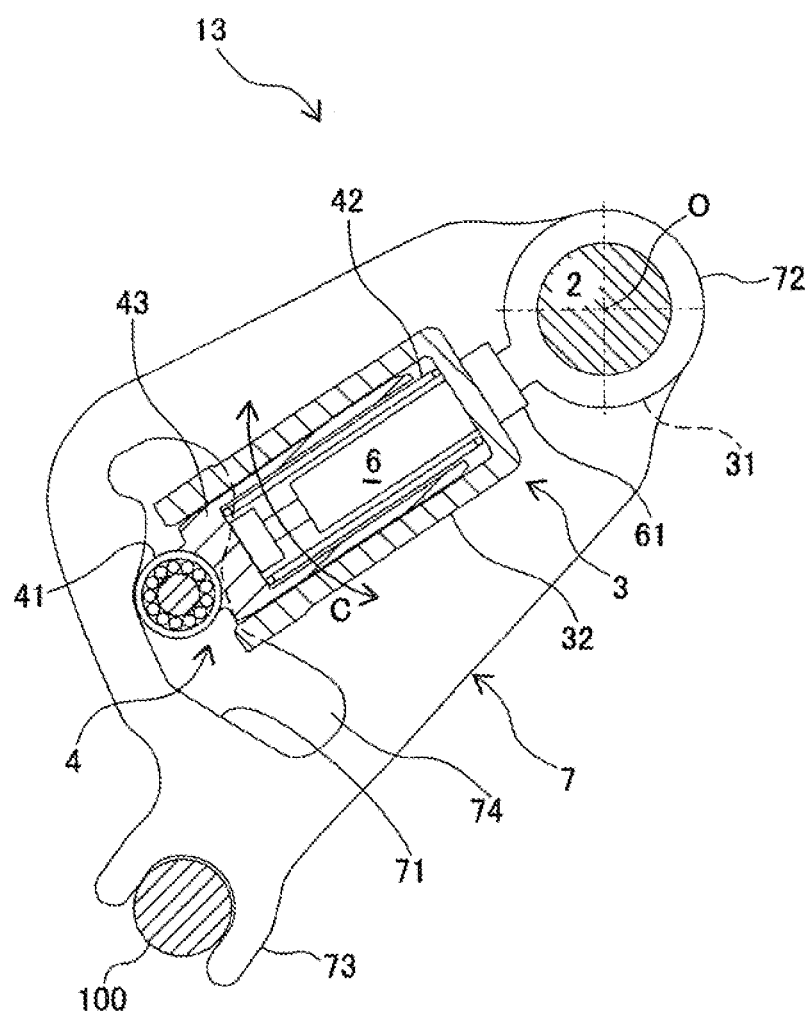
FIG. 9 is an explanatory diagram that exhibits a constitution of a shifting device 13 according to Modified Embodiment No. 1 in the partially cross section.

In the shifting device 13 according to Modified Embodiment No. 1, a cam member 7 has a configuration, which differs from that of the cam member 5 being used in the shifting device 11 according to Embodiment No. 1, as shown in FIG. 9. The cam member 7 is provided with a cam face 71 on which a roller 41 of a locking ball pin 4 rotates while coming into contact with it, and comprises a cam passage 74 with a width that does not make any interference against the rotational motions of the roller 41. And, the cam member 7 is fixed with respect to the locking ball pin 4 swingably in relative to it by means of a first installation unit 72, into which a shift lever 2 is axially inserted rotatably, and by means of a second installation unit 73 to be installed with respect to a supporting member 100.

In the shifting device 13 according to present Modified Embodiment No. 1, the arm 3 and locking ball pin 4 swing about the rotary center "O" that serves as the center (namely, in the directions of the arrow "C") while interlocking with the shift lever 2, when the shift lever 2 rotates. The roller 41 not only rotates on the cam face 71 while coming into contact with it, but also moves back and forth within the cam passage 74.

Modified Embodiment No. 2

A shifting device according to Modified Embodiment No. 2 comprises the same operations and advantageous effects as those of the shifting device 13 according to Modified Embodiment No. 1 fundamentally. In the shifting device according to Modified Embodiment No. 2, a cam member swings while interlocking with the rotational motions of a shift lever, but an arm and a locking ball pin do not swing at all.

Embodiment No. 3

Figure 10:
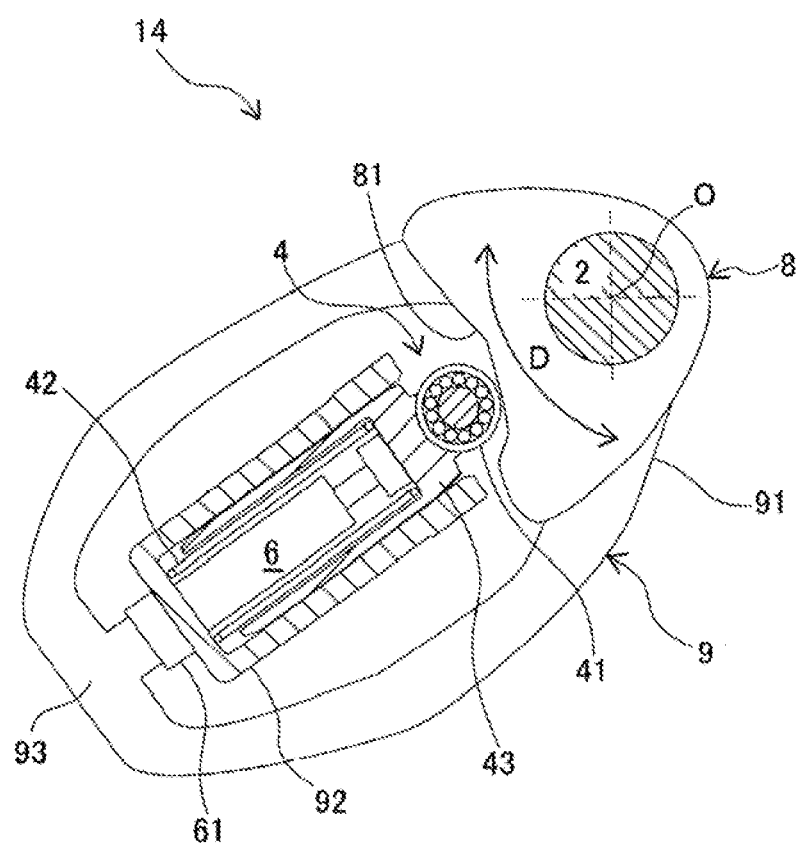
FIG. 10 is an explanatory diagram that exhibits a constitution of a shifting device 14 according to Embodiment No. 3 in the partially cross section.

As illustrated in FIG. 10, a shifting device 14 according to Embodiment No. 3 comprises a casing (not shown in the drawing), a shift lever 2, a cam member 8, a fixing member (i.e., the claimed retaining member) 9, a locking ball pin 4, and a damper 6.

The shift lever 2 is retained with respect, to the casing rotatably. The shift lever 2 interlocks with a not-shown change-speed operation lever that is subjected to change-speed, operations by a driver of automobile, and then rotates about the rotary center "O" in compliance with selecting operational forces that are transmitted in association with operations in selecting directions.

The cam member 8 comprises an irregularly-shaped, cam face 81 on which a roller 41 of a later-described locking ball pin 4 rotates while coming into contact with it. The cam member 8 interlocks with the shift lever 2 to swing (namely, in the directions of the arrow "D") about the rotary center "O" of the shift lever 2 that serves as the swing center.

The fixing member 9 is fixed with respect to the casing swingably in relative to the shift lever 2 and cam member 8. The fixing member 9 comprises an engaging unit 91 info which the shift lever 2 is axially inserted, a case unit 92 in which a later-described locking ball pin 4 is accommodated, and an integrating unit 93 that fixes and retains the case unit 92. The case unit 92 has a configuration that is opened on the side of the shift lever 2 and cam member 8, side which is positioned on the other side being opposite to the side that is fixed and retained with respect to the integrating unit 93.

The locking ball pin 4 comprises a roller 41, a spring 42, and a locking-ball-pin body unit 43. The locking-ball-pin body unit 43 is accommodated in the case unit 92 of the fixing member 9, and is opened on one of the sides that faces the integrating unit 93 of the fixing member 9. The roller 41 is present on the not-opened side of the locking-ball-pin body unit 43, and engages with the locking-ball-pin body unit 43 rotatably. The spring 42 is fixed with respect to the case unit 92 of the fixing member 9 at one of the opposite ends, and is fixed with respect to the locking-ball-pin body unit 43 at the other one of the opposite ends. The spring 42 is accommodated in the locking-ball-pin body unit 43 expandably and contractibly in such directions that connect the integrating unit 93 with the rotary center "O" of the shift lever 2 (hereinafter, being referred to as "expanding and contracting directions"). The locking ball pin 4 interlocks with the expanding and contracting motions of the spring 42, thereby moving within the case unit 92 of the integrating unit 93 in the expanding and contracting directions.

The damper 6 is fixed with respect to the integrating unit 93 of the fixing member 9 at one of the opposite ends by means of a nut 61, and is accommodated inside the spring 42 of the locking ball pin 4 expandably and contractibly in the expanding and contracting directions. The damper 6, and the locking ball pin 4 are put in place parallelly in the interior of the locking-ball-pin body unit 43.

In the shifting device 14 according to present Embodiment No. 3, when a driver operates the change-speed operation lever in order to do change-speed operations, the shift lever 2 interlocks with the operations of the change-speed operation lever to rotate around the rotary center "O", and then the cam member 8 swings about the center that the rotary center "O" makes. When the cam member 6 swings, the roller 41 of the locking ball pin 4 rolls on the cam face 81 of the cam member 8. When the roller 41 rotates along the configuration of the cam face 81, the distance between the roller 41 and the integrating unit 93 varies. That is, when the roller 41 rotates on the cam face 81 while coining into contact with it, the spring 42 of the locking ball pin 42 expands and contracts.

Disposing a space between the not-fixed or free other opposite end of the damper 6, which is present on the side of the shift lever 2, and the locking-ball-pin body unit 43 makes it possible to provide the damper 6 with operations and advantageous effects like those in that of the shifting device 11 according to Embodiment No. 1, or in that of the shifting device 12 according to Embodiment No. 2. That is, when the cam member 8 does not swing to such a position where the roller 41 and the integrating unit 93 approach one another by a distance that is more than that the space gives, a load, which arises in the spring 42, makes an operational load. When the cam member 8 swings to such a position where the roller 41 and the integrating unit 93 approach one another by a distance that is more than that the space gives, a sum of a load, which arises in the spring 42, and another load, which arises in the damper 6, makes an operational load.

So far, although explanations have been made on some of suitable embodiment modes according to the present invention, the present invention is not one which is limited to the aforementioned embodiment modes. For example, although the fluctuations in the selecting loads are reduced upon doing the operation of selecting into reverse at a high speed and at a low speed, it is possible to reduce fluctuations in all of the operational loads by adjusting the respective loads that result from the spring and the damper.

EXPLANATION ON REFERENCE NUMERALS 11, 12, 13, and 14: Shifting Devices;
2: Shift Lever;
3: Arm; 31: Engaging Unit; 32: Case Unit;
4; Locking Ball Pin; 41: Roller; 42: Spring; 43: Locking-ball-pin Body Unit;
5: Cam Member; 51; Cam Face; 52: First Installation Unit; 53; Second Installation Unit;
6: Damper; 61; Nut;
7, and 8: Cam Members; 71: Cam Face; 72, and 73: Units; 74: Cam Passage;
81: Cam Face;
9: Fixing Unit; 92: Engaging Unit; 92: Case Unit; 93: Integrating Unit; and
100: Supporting Member

The invention claimed is:

1. A manual transmission shifting device for an automobile, comprising:
  a casing;
  a shift lever being retained rotatably with respect to said casing;
  a retaining member interlocking with said shift lever to swing;
  a locking ball pin comprising a rotatable roller, a body unit retaining said roller rotatably, and an expandable and contractible spring being fixed with respect to said retaining member at one of opposite ends and with respect to said body unit at the other one of the opposite ends;
  a cam member comprising a cam face with which said roller comes into contact rotatably, and being fixed so as to be swingable relative to said locking ball pin, when said shift lever swings in selecting directions; and a damper inhibiting said spring from expanding and contracting, wherein said damper is fixed with respect to one of said retaining member and said locking ball pin on one side of said damper in expanding and contracting directions, and a clearance is disposed between the other one of said retaining member and said locking ball pin on the other side of said damper at a time of neutral when any one of a plurality of change-speed stages is not selected in the automobile, when said shift lever swings in said selecting directions, said shift lever moves among a position at said time of neutral, a position of LOW on a left side of said position at said time of neutral, a position of HIGH on a right side of said position at said time of neutral, and a position of reverse on a left side of said position of LOW, and a size of said clearance is larger than zero in a range from said position at said time of neutral to said position of LOW and said position of HIGH, and is zero in a range closer therefrom to said position of reverse.

2. The manual transmission shifting device for an automobile of claim 1, wherein said damper is positioned coaxially inside said spring.

3. The manual transmission shifting device for an automobile of claim 2, wherein:

a clearance is disposed between the retaining member and the body unit at a time of neutral when any one of a plurality of change-speed stages are not selected in the automobile.

4. The manual transmission shifting device for an automobile of claim 1 wherein:

a clearance is disposed between the retaining member and the body unit at a time of neutral when any one of a plurality of change-speed stages are not selected in the automobile.

5. A manual transmission shifting device for an automobile comprising:

a casing;

a shift lever being retained rotatably with respect to said casing;

a cam member comprising a cam face, and interlocking with said shift lever to swing, when said shift lever swings in selecting directions;

a retaining member being fixed so as to be swingable relative to said shift lever and said cam member;

a locking ball pin comprising a rotatable roller interlocking with said shift lever to come into contact with said cam face, a body unit retaining said roller rotatably, and an expandable and contractible spring being fixed with respect to said retaining member at one of opposite ends and with respect to said body unit at the other one of the opposite ends; and a damper inhibiting said spring from expanding and contracting, wherein said damper is fixed with respect to one of said retaining member and said locking ball pin on one side of said damper in expanding and contracting directions, and a clearance is disposed between the other one of said retaining member and said locking ball pin on the other side of said damper at a time of neutral when any one of a plurality of change-speed stages is not selected in the automobile, when said shift lever swings in said selecting directions, said shift lever moves among a position at said time of neutral, a position of LOW on a left side of said position at said time of neutral, a position of HIGH on a right side of said position at said time of neutral and a position of reverse on a left side of said position of LOW, and a size of said clearance is larger than zero in a range from said position at said time of neutral to said position of LOW and said position of HIGH and is zero in a range closer therefrom to said position of reverse.

6. The manual transmission shifting device for an automobile of claim 5, wherein said damper is positioned coaxially inside said spring.

7. The manual transmission shifting device for an automobile of claim 5, wherein:

a clearance is disposed between the retaining member and the body unit at a time of neutral when any one of a plurality of change-speed stages are not selected in the automobile.

* * * * *